UNITED STATES PATENT OFFICE.

CARLETON ELLIS, OF MONTCLAIR, NEW JERSEY.

FORMING AND HYDROGENATING FATTY-ACID ESTERS.

1,277,708. Specification of Letters Patent. Patented Sept. 3, 1918.

No Drawing. Application filed September 28, 1916. Serial No. 122,587.

*To all whom it may concern:*

Be it known that I, CARLETON ELLIS, a citizen of the United States, and a resident of Montclair, in the county of Essex and State of New Jersey, have invented certain new and useful Improvements in Forming and Hydrogenating Fatty-Acid Esters, of which the following is a specification.

This invention relates to certain products derived from fatty acids and to the process of making same and relates in particular to the products derived by combining fatty acids with volatile alcohols such as methyl and ethyl alcohols and the like to form esterified products and also to the products derived from the heavier alcohols such as benzyl alcohol and the like and further relates to to the products derived from the combination of fatty acids with amino or amido bodies such as anilin and the like forming anilin oleate or anilids or similar derivatives which are more or less neutral in character and which in some cases are capable of being hydrogenated by treatment with hydrogen and a catalyzer under suitable conditions to form harder or modified products by the addition of hydrogen to any unsaturated acids or other bodies which may be present. In some cases hardening is not observed but other changes in physical properties take place which are desirable. Of course, in the case of a saturated acid such as steric or palmitic acid no effect is secured thereon by the treatment with hydrogen such as would correspond to the hardening of oleic acid products.

The invention will first be described with reference to the esters of a number of alcohols with a typical unsaturated acid, namely: oleic acid. The preparation of the ester and its subsequent hydrogenation are noted in each case.

Methyl oleate.

56.4 grs. U. S. P. oleic acid were dissolved in 25.6 grs. acetone-free methyl alcohol. The solution was treated with 0.7 gr. sulfuric acid and then boiled for 5½ hours. The product, which separated into two layers on standing, was washed a number of times with distilled water until free from sulfuric acid. The emulsion that was obtained was broken by heating for a short while on a hot water bath. The oily layer was carefully decanted from the aqueous layer and dried. The oil did not possess any characteristic odor. It was homogeneous and almost colorless. It had an acid number of 17.6.

The oil was treated with a ten per cent. aqueous solution of sodium hydroxid in the cold. After intimate mixing the caustic soda was drawn off and the oil was washed with a saturated solution of sodium chlorid until the wash waters ceased to react alkaline. This treatment removed all of the free caustic soda leaving the oil and the saponified free oleic acid intimately mixed with one another. This mixture of soap and methyl oleate was shaken with fifteen to twenty times its volume of water and allowed to stand until the emulsion separated into two layers. The lower turbid layer containing most of the soap in solution was drawn off and the operation was repeated until the wash waters were free from turbidity. The dried ester was a liquid and was milky in appearance. On standing for several hours the turbidity disappeared from the upper portion of the ester. The acid number of the oil fell to 1.3. The iodin number was found to be 87.0. The theoretical iodin number of methyl oleate is 85.8.

The experiment repeated with the object of preparing methyl oleate free from turbidity gave the same results as obtained above.

Hydrogenation of methyl oleate.

A portion of methyl oleate containing one per cent. of finely-divided metallic nickel (reduced for fifteen to twenty minutes in a stream of hydrogen at 320–350° C.) was treated with hydrogen for about 2 hours at about 180–200° C. which was simply allowed to bubble through the liquid as a brisk stream, thereby maintaining the catalyzer in suspension. The mixture of oil and catalyzer was filtered in the hot oven. The filtered solid product obtained was white and crystalline. It had an iodin number of 0.4 and melted at 27° C.

The melting point of this product as well as the melting point of the esters described below were determined as follows:—

A glass capillary tube about two inches long and open at both ends was filled about one-sixth full with molten oil. After the oil had solidified the capillary was attached in the usual way to a thermometer and immersed in a water bath having the upper part of the capillary above the surface of the liquid. The melting point noted was that temperature at which the oil became sufficiently molten to be moved upwardly in the capillary by the pressure of the water.

Ethyl oleate.

50 grs. oleic acid, 50 grs. of ethyl alcohol (sp. gr. 0.816 at 15° C.) and 1 gr. concentrated sulfuric acid were boiled for 4½ hours. The product on standing separated out a heavy oil. Separation of oil in this manner was also observed in the other esterification experiments. The product was washed with distilled water until it was free from alcohol and sulfuric acid. The emulsion of water and oil was treated in the same way as the emulsion obtained in the case of methyl oleate. The dried oil was a straw yellow color and possessed an agreeable odor. The acid number of the product was 19.8.

The free oleic acid was removed with 10 per cent. aqueous sodium hydroxid according to the method described under methyl oleate. The acid number of the ethyl oleate was reduced by this treatment from 19.8 to 0.6. Its iodin number was 83.3. The iodin number of pure ethyl oleate is 81.9.

Hydrogenation of ethyl oleate.

A portion of the ethyl oleate containing one per cent. of metallic nickel (reduced for fifteen minutes in a stream of hydrogen at 320–350° C.) was exposed to a rapid current of hydrogen for about 2 hrs. The oil was filtered through an ordinary filter paper in the hot oven. The product melted at 31° C. Its iodin number was 5.3.

Propyl oleate.

56.4 grs. oleic acid, 24 grs. propyl alcohol (Kahlbaum) and 0.4 grs. concentrated sulfuric acid were boiled for 4½ hours. The mixture was washed free from sulfuric acid and alcohol and the oil was dried in the usual way. The acid number of the product was 11.2. It was then treated with alkali according to the method described above. The acid number was reduced by this treatment to 0.5. The product was practically colorless and without odor. Like methyl oleate it possessed a marked turbidity, but on standing the upper portion of the product became clear. The iodin value of the product was found to be 77.9. The iodin value of pure propyl oleate is 78.4.

Hydrogenation of propyl oleate.

The hydrogenation in this case was carried out under conditions practically identical to those employed in the hydrogenation of methyl and ethyl oleate. The hardened oil had an iodin number of 1.3. It melted at 27° C.

Iso-butyl oleate.

The amounts of material employed in the preparation of iso butyl oleate were 56.4 grs. oleic acid, 29.6 grs. iso butyl alcohol (C. P.) and 0.5 grs. concentrated sulfuric acid. The mixture was boiled for 5¼ hours and then washed free from sulfuric acid and steam distilled until the distillate came over odorless. The oil had an acid number of 9.3. Treatment with alkali reduced the acid number to 0.4. The ester was of a straw yellow color and practically odorless. It had an iodin number of 75.7. The iodin number of pure iso butyl oleate is 75.1.

Hydrogenation of iso-butyl oleate.

The ester was hydrogenated for about 2 hours in the presence of one per cent. metallic nickel (reduced for 15 minutes at 320–350° C.). The temperature of hydrogenation was 180–200° C. The hydrogenated product was soft and translucent and distinctly crystalline. It resembles somewhat crude paraffin. It had an iodin value of 0.2 and melted at 25° C.

Amyl oleate.

Amyl oleate was prepared as follows:—
56.4 grs. oleic acid, 33.2 grs. amyl alcohol (B. P. 130–132) and 0.9 grs. concentrated sulfuric acid were boiled under reflux for 5¼ hours. The product was washed free from acid and steam distilled until the distillate came over odorless. The dried ester had an acid number of 4.5. After treatment with alkali solution the acid number fell to 0.7. The ester was brownish yellow in color and possessed an odor characteristic of fats and oils. Its iodin value was 71.3. The iodin value of pure amyl oleate is 72.1.

Hydrogenation of amyl oleate.

The product was hydrogenated in the usual manner under conditions similar to those employed in the previous experiments. The hydrogenated product was soft and homogeneous consisting of a liquid oil and a crystalline body. It resembled crude paraffin. It had an iodin value of 1.7 and melted at 22° C.

Glycerin oleate.

56.4 grs. oleic acid and 18.4 grs. glycerin were heated for 5 hours at 240° C. under continuous stirring. The oily product was washed several times with warm water and dried. Its acid number was 0.6. It was dark in color, very viscous and not uniform in appearance. In cool weather a crystalline body formed which rendered the ester opaque. The iodin number of the product was 69.4. Pure glyceryl mono oleate has an iodin number of 71.3.

*Hydrogenation of glyceryl oleate.*

The ester was hydrogenated in the usual way. Treatment with hydrogen for about 2 hours at 180–200° C. gave a product which melted at 59° C. and possessing an iodin number of 6.5. The hydrogenated product was similar in appearance to a good grade of hardened cottonseed oil, except that it was somewhat darker in color.

*Benzyl oleate.*

56 grs. oleic acid, 49 grs. benzyl alcohol and 1 gr. concentrated sulfuric acid were boiled under reflux for 6 hours. The product was steam distilled until the distillate came over odorless. The oil was then treated with alkali to remove the free oleic acid, dried and distilled at 25—40 m. m. pressure. The oil came over largely at 275-285 C. It was light yellow in color and practically odorless. Its acid value was 0.7, and the iodin value was 62.3. The iodin value of pure benzyl oleate is 68.2. In another case, the same amounts of benzyl alcohol and oleic acid were used but the amount of sulfuric acid was reduced to 0.5 grs. The mixture was heated for 5¼ hours at 145–150° C. The product was steam distilled, washed free from acid and dried. It had an acid number of 8.7. Treatment with sodium hydroxid solution reduced the acid number 0.4. The ester was of a dark brown color, almost odorless and had an iodin value of 54.5.

*Hydrogenation of benzyl oleate.*

Hydrogenation in the presence of finely divided reduced nickel gave a product which had an iodin value of 6.3, and a melting point of 28° C.

*Behavior of oleic acid with phenol, resorcin and beta naphthol.*

28.2 grs. oleic acid and 37.6 grs. phenol were boiled for 4 hours under reflux. The product was then washed with boiling water until it was free from phenol. The acid number of the dried oil was 201. 28 grs. oleic acid and 22 grs. resorcin were treated for 4 hours to 180–200° C. A considerable amount of the resorcin was lost by sublimation. The product darkened considerably. It was purified by washing with hot water and drying. Its acid value was 197. Beta naphthol when heated with oleic acid for several hours to 200° C. failed to combine with it.

*Oleic acid and anilin.*

24.4 grs. anilin and 37 grs. oleic acid were heated under a reflux condenser for 4 hours at 170–190° C. The mixture darkened considerably. It was steam distilled until the distillate was free from aniline. The acid number of the steam distilled product was 30.5. It became solid on standing. The substance was treated with a solution of sodium hydroxid and washed free from alkali and sodium oleate. The acid number of the product was reduced to 3.6. The product melted at 34° C. It was dark brown in color and had a greasy feel.

*Hydrogenation of the product.*

The material was hydrogenated for 2 hours at 190–200° C. in the presence of 1% reduced finely-divided metallic nickel. The hydrogenated product was filtered in the hot oven. It had an iodin number of 30.5. The iodin value of the unhydrogenated substance was 69.5. The iodin value of oleic anilid is 71.6. The product melted at 76° C. and was very hard and brittle.

*Para amido phenol and oleic acid.*

11 grs. para amido phenol and 28 grs. oleic acid were heated for 6 hours at 180–200° C., yielding a black waxy substance which melted at 77° C. It was soluble in most organic solvents imparting thereto a deep brown color. In alcoholic caustic potash it dissolved with a deep blue color.

A composite or compound between anilin and alcohol with stearic acid was obtained in the following manner:—

2 parts of anilin and 3 parts of stearic acid were heated for four hours to 170–180° C. and after steam distilling to remove the unconverted anilin the acid number of this product was found to be 91.5. 30 parts of this product and 30 parts of methyl alcohol were mixed and 1 part of hydrochloric acid added thereto. The mixture was boiled under a reflux condenser for about four hours and was then washed to remove the hydrochloric acid and uncombined methyl alcohol. The acid number of the product was now found to be 3.7 and the melting point was 67° C.

*Ortho toluidin and oleic acid.*

28 parts by weight of oleic acid and 10.7 parts of ortho toluidin were heated for four hours at a temperature of 180 to 200° C. with a reflux condenser. The product had an acid number of 77 and was steam distilled until the distillate came over free from toluidin. The substance left behind was treated with ten per cent. caustic potash solution, shaken and washed free from the alkali by means of a solution of brine and was then washed with water a number of times to remove potassium oleate. The final product was distinctly crystalline and had an acid number of 2.7.

*Xylidin and oleic acid.*

24.7 grs. of mixed xylidins were heated with 56.2 grs. of oleic acid for five hours at a temperature of 180-195° C. employing a reflux condenser. The excess of xylidin was removed by steam distillation and to the residue a ten per cent. solution of caustic potash was added until the product was slightly alkaline. The mixture was washed with a saturated solution of salt until free from alkali and the washing was continued with water until all soap was removed. A brown oil resulted from this treatment. This was dissolved in alcohol and treated with one-tenth normal caustic potash solution until alkaline. The addition of the alkali solution precipitated a body which was washed and dried and found to have an acid number of 3.5.

*Quinolin and oleic acid.*

When quinolin and oleic acid are heated to 200-220° C. no material amount of combination occurs which brings about a change in the acid number.

*Acetamid and oleic acid.*

28.2 parts of oleic acid and 5.9 parts of acetamid were heated for four hours at a temperature ranging from 160-180° C. A black product resulted which was washed with water and dried and afforded an acid number of 150.

*Diphenylamin and oleic acid.*

28.2 parts by weight of oleic acid and 16.9 parts of diphenylamin were heated for four hours at a temperature ranging from 195 to 205° C. The product was steam distilled for eight hours. The diphenylamin continued to come over in the current of steam. This residue in the distillation vessel was dried and on standing for several days the amin separated from the oil in the form of plates. The oil was filtered and found to have an acid number of 198 showing that practically no reaction had taken place between the oleic acid and diphenylamin capable of causing a modification of the acid number.

*Urea and oleic acid.*

28.2 parts by weight of oleic acid and 6 parts of urea were heated for four hours at 200° C. A nearly solid product was obtained which was boiled with water to remove the unchanged urea and then washed with an excess of ten per cent. caustic potash solution at a temperature of about 45-50° C. to remove the excess of oleic acid. The product was further washed several times with hot water until freed from alkali and soap. A crystalline body was obtained from this treatment which possessed an acid number of 9.7. Some of the product was dissolved in alkali and one-tenth normal caustic potash solution was added to the alkali solution until the mixture was faintly alkaline. Water was then added to precipitate the urea oleic acid compound, which was filtered and dried.

*Beta-naphthylamin and oleic acid.*

28.2 parts of oleic acid and 14.3 parts of beta-naphthylamin were heated to 180-200° C. for four and a half hours using an air cooled reflux condenser. After this operation the product was boiled several times with water until freed from most of the unchanged beta-naphthylamin. It was then dissolved in alkali and the solution treated with dilute caustic soda solution until slightly alkaline. The beta-naphthylamin oleic acid compound was precipitated from the alkali solution by the addition of water and in this manner a product was finally obtained having an acid number of 5.6. By repetition of this treatment a product having an acid number of 1.5 was obtained. This was a solid crystalline substance which discolored on exposure to light.

Similarly diamins such as phenylene diamin may be combined with oleic, stearic or other fatty acid.

Such amino compounds when still of an acid nature may be esterified with alcohols to form composite products.

Amino products capable of diazotization may be treated with nitrous acid and coupled with other reactive bodies to form e. g. the para amido phenol series, some of which owing to the fatty acid radical have a desirable degree of solubility in oils or hydrocarbons.

High melting point products are obtained with, for example, anilin and stearic acid, which may be used in shoe polishes, floor dressings and polishes and for similar purposes.

In the union of alcoholic bodies with oleic or similar fatty acid a catalytic substance such as hydrochloric or sulfuric acid is preferably present but other catalyzers may likewise be used in a similar manner in the formation of the compounds of amins with fatty acids. Solid catalytic bodies may likewise be used to facilitate the reaction.

The hydrogenation of the foregoing esters and amino compounds may be carried out in some cases with a nickel catalyzer employing hydrogen at ordinary pressure or at a high pressure and working at a temperature of 150 to about 200° C., while in other cases the hydrogenation may be carried out at a lower temperature employing platinum or palladium as catalyzer and if necessary employing solvents to dissolve the ester or amino compound in order to better carry out the hydrogenation process.

Instead of using the fatty acids, namely; oleic, palmitic, stearic and similar or associated fatty acids derived from fats and the like, the foregoing procedure may be applied to the treatment of rancid oils whereby an acid oil is rendered more nearly or entirely neutral and when intended for use as a hydrogenating product the hydrogenation process may be carried out more easily in most cases with such neutralized material. The following indicates the application of the method to a number of oils which are commonly found containing a considerable amount of free fatty acid which would be of such a rancid disagreeable nature as to be unfit for many uses to which clean fatty neutral oils are capable of employment.

Fish oil.

250 grms. of fish oil of an acid number of 25.1 were boiled under reflux condenser with 75 c. c. of wood alcohol and 3 cubic centimeters of hydrochloric acid (39%) for three hours. The product was steam distilled until the distillate came over free from the odor of wood alcohol. The residue in the flask was then washed a number of times with water and dried. The oil had an acid number of 1.3. In a comparative test, some of the oil was detoxicated and its behavior in the hydrogenation stage noted. 100 grms. of the oil and 1 grm. of a detoxicating compound, namely; copper hydrate, were stirred vigorously for 1 hour between 100–120° C. The copper hydrate was allowed to settle. Like quantities of the unesterified fish oil, the esterified product and the oil treated with copper hydrate as described above were each hydrogenated in the presence of finely divided metallic nickel reduced at 360° C. for 15 minutes. The hydrogenation was carried on at 180° C. for 3 hours. The conditions of hydrogenation in all three oils were kept alike as far as possible. Temperature of oil and rate of flow of hydrogen were almost the same in all three cases. The hydrogenation was carried out in parallel. The three vessels containing the oil and catalyzer were immersed in the same oil bath and the hydrogen was passed into the oil by means of a tapering tube extending to the bottom of the container to bring about as far as possible an intimate mixing of the oil and catalyzer. No attempt was made to hydrogenate to complete saturation. After the hydrogenation the oil was filtered through an ordinary filter in a hot oven. The iodin number of the unesterified fish oil after hydrogenation was 123, that of the ester after hydrogenation was 109, while the iodin number of the copper treated oil after hydrogenation was 100.

Cod oil.

250 grams of cod oil which had an acid number of 22.0, 75 c. c. of commercial wood alcohol and 3 c. c. of hydrochloric acid were boiled under reflux for three hours and then steam distilled until free from alcohol. The oil was washed with water a number of times until the last traces of acid were removed and then dried. The acid number of the dried oil was reduced to 3.2 and the oil hydrogenated readily.

Whale oil.

A sample of whale oil having an acid number of 33.5 was esterified with wood alcohol in the presence of hydrochloric acid in the same manner as above indicated, that is; 250 grms. of the oil, 75 c. c. of wood alcohol and 3 c. c. of hydrochloric acid were boiled under reflux condenser for three hours and steam distilled until the distillate came over free from wood alcohol. The washed and dried esterified whale oil had an acid number of 1.8 and yielded a satisfactory hydrogenated product.

Tuna oil.

A sample of tuna oil was used in one case, which contained large amounts of albuminous bodies in suspension. These were coagulated during the esterification and gave a clear light colored esterified product. After esterification the oil was treated with hydrogen in the presence of a hydrogenating catalyzer.

Palm oil.

A sample of palm oil having an iodin number of 125 was used. Esterification carried out with 250 grms. of the oil, 75 c. c. of wood alcohol and 3 c. c. of hydrochloric acid under reflux condenser and boiling for three hours gave a product which after steam distillation, washing and drying had an acid number of 24.5. A second esterification reduced the acid number to 3.7. The original palm oil was semi solid and granular. The esterified product was liquid. It was subjected to the hydrogenation step. The iodin number of the hydrogenated palm oil was found to be 49.5, that of the hydrogenated palm oil ester after hydrogenation was 30.

Cottonseed oil.

A sample of cottonseed oil used in one test was rather dark in color and had an acid number of 14.5. Esterification of this oil with 20% of wood alcohol and 1% of hydrochloric acid (39%) reduced the acid number to 1.4. The purification of the ester was carried out as described above. A part of the ester was treated with 1% copper hydrate at 100° C. for one hour under vigorous stirring. These three oils were hydrogenated in the presence of finely-divided metallic nickel. The unesterified cottonseed oil had an iodin number after hydrogenation of 72.8. The esterified hydrogenated cottonseed oil after hydrogenation had an iodin number of 33.4, and the esterified cottonseed oil treated with copper hydrate had an iodin number of 24.4.

When oleic acid is combined with some of the foregoing alcoholic or basic bodies and hydrogenated the consistency of the resulting product usually differs from that obtained when stearic acid or palmitic acid is combined in like manner. The tendency of stearic acid is to form crystalline compounds while some of the oleic acid bodies after subjection to the hydrogenation step, especially after a certain degree of saturation with hydrogen, possess more of an amorphous consistency.

By the term "fatty acids" or "higher fatty acids" as used herein primarily the designation is intended to refer to acids having at least twelve carbon atoms and more particularly the acids having sixteen, eighteen and twenty carbon atoms, including oleic, stearic, palmitic, behenic acid and the like.

A further series of compounds is obtained with benzidin which may be combined with the foregoing fatty acids to form compounds of extremely high melting point.

Copending application Serial No. 67,452 contains certain matter pertaining to the foregoing, relating to the esterification of oils containing free fatty acids to fit these oils for hydrogenation purposes.

What I claim is:—

1. The process of making fatty products which comprises heating an alcohol with oleic acid; whereby the ester of oleic acid is formed and in contacting the product with hydrogen in the presence of a hydrogenating catalyzer.

2. The process of making fatty products which comprises heating a volatile alcohol with oleic acid in the presence of an esterifying catalyzer; whereby the ester of oleic acid is formed and in contacting the product with hydrogen in the presence of a hydrogenating catalyzer.

3. The process of making fatty products which comprises heating an alcohol with oleic and stearic acid in the presence of an esterifying catalyzer; whereby fatty ester is formed and in contacting the product with hydrogen in the presence of a hydrogenating catalyzer.

4. The process of making fatty products which comprises heating an alcohol with unsaturated fatty acid; whereby fatty ester is formed and in contacting the product with hydrogen in the presence of a hydrogenating catalyzer.

5. The process of making fatty products which comprises heating ethyl alcohol with an unsaturated fatty acid; whereby a fatty ester is formed and in contacting the product with hydrogen in the presence of a hydrogenating catalyzer.

6. The process of treating fatty glycerids containing free fatty acid which comprises esterifying some portion at least of the fatty acid with an alcohol and in contacting the product with hydrogen in the presence of a hydrogenating catalyzer.

7. The process of making fatty products which comprises esterifying a fatty glycerid containing free fatty acid whereby some portion at least of the free fatty acid is converted into an ester of a lower alcohol, and in hydrogenating the resulting product.

8. The process of treating fatty oils containing free fatty acid which comprises esterifying some portion at least of the free fatty acid with ethyl alcohol and in hydrogenating the fatty oil product.

CARLETON ELLIS.